United States Patent
Michel

(10) Patent No.: US 10,046,499 B2
(45) Date of Patent: Aug. 14, 2018

(54) METHOD AND DEVICE FOR PRODUCING A PLATE MATERIAL

(71) Applicant: Kreafin Group SA, Luxembourg (LU)

(72) Inventor: Yves Michel, Meldert (BE)

(73) Assignee: Kreafin Group SA, Luxembourg (LU)

( * ) Notice: Subject to any disclaimer, the term of this patent is extended or adjusted under 35 U.S.C. 154(b) by 228 days.

(21) Appl. No.: 14/917,459

(22) PCT Filed: Sep. 9, 2014

(86) PCT No.: PCT/IB2014/064345
§ 371 (c)(1),
(2) Date: Mar. 8, 2016

(87) PCT Pub. No.: WO2015/033325
PCT Pub. Date: Mar. 12, 2015

(65) Prior Publication Data
US 2016/0229105 A1    Aug. 11, 2016

(30) Foreign Application Priority Data

Sep. 9, 2013   (BE) .................................. 2013/0590

(51) Int. Cl.
| | |
|---|---|
| *B29C 47/00* | (2006.01) |
| *B29C 43/24* | (2006.01) |
| *B29C 47/34* | (2006.01) |
| *B29C 47/08* | (2006.01) |
| *B29C 47/88* | (2006.01) |

(52) U.S. Cl.
CPC .......... *B29C 47/0066* (2013.01); *B29C 43/24* (2013.01); *B29C 47/004* (2013.01); *B29C 47/0019* (2013.01); *B29C 47/0059* (2013.01); *B29C 47/0898* (2013.01); *B29C 47/34* (2013.01); *B29C 47/8845* (2013.01); *B29C 2793/0027* (2013.01)

(58) Field of Classification Search
CPC .................................................. B29C 47/0059
See application file for complete search history.

(56) References Cited

U.S. PATENT DOCUMENTS

| | | | | |
|---|---|---|---|---|
| 3,960,986 | A | * 6/1976 | Heichele | ................. C08L 27/06 525/85 |
| 4,101,620 | A | 7/1978 | Kops | |
| 4,776,998 | A | 10/1988 | Davidson | |
| 4,954,306 | A | 9/1990 | Jamet | |
| 6,257,862 | B1 | * 7/2001 | Nissel | ................. B29C 47/0021 226/118.2 |
| 2004/0224141 | A1 | 11/2004 | Seiling | |
| 2005/0023717 | A1 | * 2/2005 | Watanuki | ............... B26D 1/565 264/148 |

FOREIGN PATENT DOCUMENTS

DE    3941120 A1    6/1991

OTHER PUBLICATIONS

Callister, Materials Science and Engineering an Introduction, 2000, John Wiley and Sons, Inc, Fifth Edition, p. 795.*

* cited by examiner

*Primary Examiner* — Timothy Kennedy
(74) *Attorney, Agent, or Firm* — James Creighton Wray; Meera P. Narasimhan

(57) ABSTRACT

The present invention relates, on the one hand, to a method for forming a plastic sheet material (1). On the other hand, the present invention relates to a device (5) which is adapted to carry out such a method.

10 Claims, 2 Drawing Sheets

METHOD AND DEVICE FOR PRODUCING A PLATE MATERIAL

This application claims the benefit of Belgian application No. BE-2013/0590 filed Sep. 9, 2013, and PCT/IB2014/064345 filed Sep. 9, 2014, International Publication No. WO 2015/033325 A2, which are hereby incorporated by reference in their entirety as if fully set forth herein.

The present invention relates, on the one hand, to a method for forming a plastic sheet material. On the other hand, the present invention relates to a device which is adapted to carry out such a method.

The sheet material which is produced by means of such a method is in particular a plastic panel which may be both a floor and a wall panel. The thickness of such panels is preferably between 2 and 10 mm, in particular between 3 and 8 mm. The panels which are normally made preferably have a width of between 10 and 300 cm and a length of between 10 and 500 cm.

The panels are produced by means of an extrusion process in which a polymer mass is melted under pressure and temperature, subsequently forced through an extruder head and pulled from this extruder head in the form of a plate-shaped plastic strand, which is then cooled down between two or more rollers of a rolling device and formed to produce a plate of a certain thickness.

A drawback of this technique is the fact that stresses are produced in the finished material. This results in the risk of hairline cracks or deformations potentially being produced in the material at a later stage.

In order to remove such internal stresses from the material, it is known in the field relating to the production of sheet material (thickness less than 1 mm) to subject the material to a bending operation before cooling it by means of cooling rollers. Such a solution is described in US patent publication U.S. Pat. No. 4,954,306, which describes how a polyvinyl butyral sheet having a thickness of 0.76 mm is, after heating, first subjected to a bending operation and is then cooled by means of cooling rollers in order then to be wound onto a stock roll. The degree of bending is determined by adjusting the forwards movement of the sheet.

However, the device and method described in U.S. Pat. No. 4,954,306 are only suitable for producing sheet material of limited thickness (less than 1 mm) which, in addition, has to be sufficiently elastic (low modulus of elasticity) that the sheet can still be rolled up after having been cooled.

It is now an object of the present invention to provide a method which will allow the production of relatively thick sheet material without stresses.

The object of the invention is achieved by means of a method for forming a sheet material in which a polymer mass is melted under pressure, subsequently forced through an extruder head in the form of a plate-shaped plastic strand, which is then processed between two or more rollers of a rolling device to form a plate of a certain thickness which is then removed by means of a removing device in the direction of a sawing device in order to be shortened to the desired length, in which the resulting plate has a thickness of at least 2 mm when leaving the rolling device and is subjected to a bending operation in order to lower the internal material stress of the plate, before being removed by means of the removing device. Preferably, the internal stress will be lowered to virtually zero. The thickness of the resulting plate is preferably between 2 and 10 mm.

In a preferred method according to the invention, the degree of bending is controlled by a force which is exerted on the sheet material by a control device while it is being removed in the direction of the sawing device. However, this force is kept to a minimum, preferably less than 1 Nm, in order to generate as little internal stress as possible in the removed sheet material. During removal, the sheet material moves in the direction of the sawing device as a result of its own weight, in this case the control device will generate a counterpressure, so that the sheet material is subjected to a sufficient bending operation after leaving the rolling device. Once the sheet material has passed the control device, the control device will exert a sufficiently large force on the sheet material to push it in the direction of the sawing device, where it is sawn into pieces.

In a more preferred method, the resulting plate is removed downwards by means of the removing device in order to keep the force to a minimum. This is preferably carried out by means of a sloping roller track. Due to the sloping arrangement, the resulting sheet material will be removed by the action of the force of gravity. As a result thereof, only a minimal force has to be exerted on this sheet material during removal thereof, so that no additional (internal) stress is produced while further cooling takes place during removal of the plate. The control device is also designed to move the sheet material to the sawing device.

For the area of application of the present invention, in particular sheet material suitable for wall, floor or façade covering for both internal and external applications, it is important that the plates produced are sufficiently stiff. A measure for the stiffness or rigidity of a material is the modulus of elasticity (E). According to the method of the invention, the resulting plate has a modulus of elasticity (E) of at least 1 GPa (1000 N/mm$^2$). Preferably, the modulus of elasticity (E) is at least 1.5 GPa, in particular at least 2 GPa and more particularly between 1.5 and 2.5 GPa. The modulus of elasticity may be controlled by choosing a specific blowing agent.

In order to ensure that the E modulus of the sheet material according to the invention is kept at a sufficiently high level, few, if any, plasticizers are added to the polymer mass. Preferably, the maximum amount of plasticizer is 15% by weight, more preferably at most 10% by weight. In a more particular embodiment, the sheet material comprises no (0% by weight) plasticizers.

The sheet material in accordance with the method according to the invention is preferably PVC, and preferably the sheet material is not made from emulsion PVC (E-PVC), but from suspension PVC (S-PVC). In particular, the softening temperature (Vicat) of the S-PVC is over 65° C.

According to a particular embodiment of the method, the sheet material has a K value of at least 50 and at most 78. The K value is preferably between 55 and 69.

Another subject-matter of the present invention is a device for forming a sheet material comprising an extrusion device for forming a plate-shaped plastic strand, a rolling device comprising one or more rollers configured to process the plate-shaped plastic strand to form a plate having a minimum thickness of 2 mm, and a removing device for removing the plate in the direction of a sawing device, in which the device comprises detection means, and in which the device is configured to control the speed of removal of the plate in such a way that, based on the signals generated by the detection means, when the plate is subjected to a bending operation leaving the rolling device.

In a preferred embodiment of the device according to the invention, the removing device comprises a roller track which is inclined towards the sawing device. It is evident that the roller track can be replaced by another device which is also suitable for conveying the sheet material in the direction of the sawing device, such as for example a conveyor belt.

According to a more particular embodiment of the device according to the invention, the removing device furthermore comprises a control device configured to exert a force (F) for controlling the speed of removal of the plate. The control device preferably comprises two pressure rollers between which the sheet material moves. On the one hand, these rollers ensure that the sheet material is partly slowed down, so that the required bending operation remains (should this not be the case, the bending operation would be skipped due to the own weight of the sheet material). On the other hand, the rollers push the sheet material in the direction of the sawing device after the sheet material has passed the control device.

The device according to the invention is in particular suitable for forming sheet material in accordance with the above-described method.

In order to explain the features of the present invention and to indicate additional advantages and particulars thereof, a more detailed description of the method and device according to the invention is given below. It will be clear that nothing in the following description can be interpreted as a limitation of the scope of protection defined in the claims.

BRIEF DESCRIPTION OF THE DRAWINGS

This description is illustrated by means of the attached drawings, in which.

DETAILED DESCRIPTION

Figure 1:
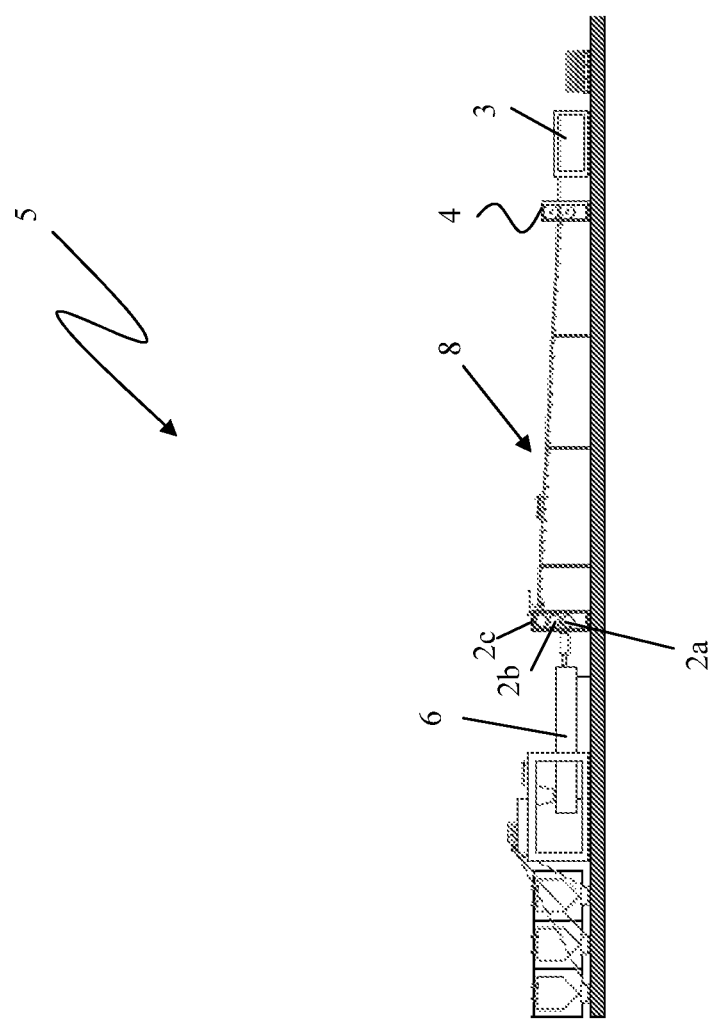
FIG. 1 shows a diagrammatic view of a device according to the invention.

The method according to the invention was developed for forming plates or tile elements which are required to be sufficiently stiff in cooled form. The modulus of elasticity (E) is a measure for the stiffness or rigidity of a material. In accordance with the method according to the invention, the plates produced have a modulus of elasticity (E modulus) of at least 1 GPa (1000 N/mm$^2$) and preferably of at least 1.5 GPa. The plates produced will, for example, be used in wall, façade and ceiling coverings for internal and external applications. Because of this area of application, where the elements produced will often be subjected to a thermal load after installation (e.g. due to sunlight), it is very important to ensure that no internal stresses occur in the sheet material during production. This serves to prevent these stresses from being released after installation by the effect of, for example, the sunlight and having a negative effect on the installed product, e.g. warping or cracking.

The method according to the invention has been developed mainly for so-called "hard polymers" and not for so-called "soft polymers". The method according to the invention preferably relates to forming sheet material from "hard" polyvinyl chloride (PVC). However, other materials which are suitable for forming sheet material and are sufficiently stiff after curing, such as for example polypropylene (PP) or polyethylene (PE), optionally reinforced with fibres, such as for example wood fibres, glass fibres, etc., also fall within the scope of protection of the present invention.

The plate (1) is sufficiently strong (stiff) in its cooled form if it is made from hard PVC. If PVC is used, the difference between "hard" and "soft" is mainly achieved by adding a larger or smaller amount of plasticizers or the use of PVC resins having a lower or higher K value. The type of PVC which is preferably used is a suspension PVC (S-PVC) and not an emulsion PVC (E-PVC). Preferably, the sheet material is made from S-PVC having a medium K value (e.g. K 65-68) or S-PVC having a low K value (e.g. K 58-60). The K value is an indication of the molecular weight and also the associated degree of polymerization during the production process of these PVC resins.

In order to keep the E modulus of the formed sheet material at a sufficiently high level, no or only minimal amounts of plasticizers are added to the starting material (e.g. S-PVC) during the mixing process of the S-PVC resins with other additives, such as for example heat stabilizers (lead, zinc, calcium zinc, etc.), mineral fillers, flow improvers, waxes, blowing agents, etc.

The maximum amount of plasticizers is preferably 10-15% by weight and more particularly less than 10% by weight. In an ideal embodiment, no (0% by weight) plasticizers are added.

In order to form the sheet material, first all the different materials, including substantially polymers and minerals, are taken to a premixer by means of screw conveyor where a first homogenization of the different materials is carried out. Thereafter, they are dropped in a funnel which then takes the material to an extrusion device (6) comprising one or more screws. These screws are placed in different temperature zones and serve to heat (gel) and transport the material, which is partly caused by the special geometry of the screws. As a result of this transportation and pressure build-up, they are pushed through the die. The opening of the die (extruder head) determines the thickness of the plates (plate-shaped plastic strand).

After the plate-shaped plastic strand has left the extruder head, the plate-shaped material is finely calibrated and made free from stresses. In order to achieve this, very clear parameters have to be observed. This procedural sequence comprises various parts, namely: a rolling device composed of three rollers (2a; 2b; 2c), arranged one above the other, over which the sheet material will move, a roller track (8) comprising a number of rollers placed in series over which the sheet material will move and a control device (4) comprising two (drivable) rollers arranged one above the other between which the sheet material will pass.

The three rollers (2a; 2b; 2c) of the rolling device (2) rotate synchronously and are constantly kept at the correct temperature. The plate-shaped plastic strand is transported upwards from below. The correct temperature and pressure ensure that the correct thickness of the strand is also achieved across the entire width of the plate.

When passing from the rolling device (2) to the removing device, in particular the roller track (8) (or in this case a conveyor belt), the plate should in no case run straight. It is important that the already partly cooled sheet material (1) is allowed to bend, for example by arranging it in the shape of a bag before reaching the roller track (8) (see FIG. 2). This is achieved by programming a synchronization between a detection means (7), for example an eye/sensor (which checks a specific distance between the plate and the eye), and the force/pulling speed of the control device. If the sheet material (1) is subjected to stress (straight!), then the control device should exert less pulling force and vice versa. This is an innovative development and makes it possible to make a stress-free plate (panel).

In a last stage, the supplied sheet material (1) is sawn to the desired dimensions by means of, for example, a sawing device (3) which is arranged in line with (downstream of) the control device (4).

Figure 2:
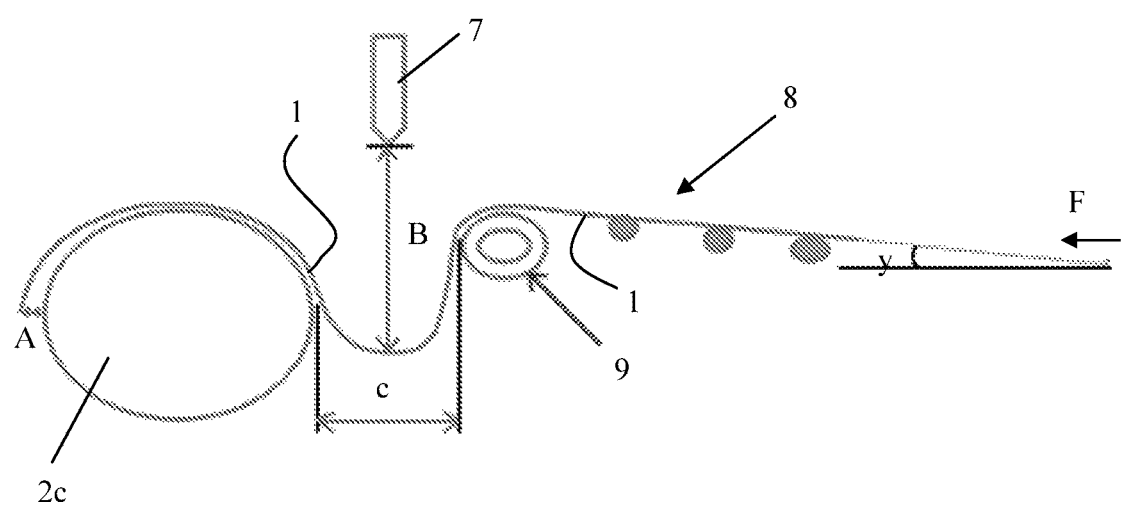
FIG. 2 shows a detail view of a part of the device, clearly showing the bending operation of the sheet material.

The invention will be illustrated in more detail below with reference to FIG. 2, using the following definitions:

Force F: the force which is exerted by the control device on the sheet material.

Distance A: the distance between the plate and the upper roller (2c);

Distance B: the distance between the sensor (7) and the lowest point of the sagging sheet material between the upper roller (2c) and the first roller (9) of the roller track (8) which is arranged between the rolling device and the control device.

Distance C: the distance between the contact surface of the sheet material on the upper roller (2c) and the contact surface on the first roller (9) of the roller track (8);

Angle y: the inclination of the roller track (8). The angle y is preferably greater than 0° and smaller than 50°, and preferably between 2° and 10°.

The sensor (7) which will measure distance B sends a signal to the control device (4). The rollers of the control device (4) will, on the basis of this signal, start to rotate at a certain speed in order to keep this distance B as constant as possible. The sensors measure distance B each second, so that an average of a number of measurements can then continuously be calculated and a signal based on these average values is then transmitted to the motors of the control device (4) which are then continuously driven by means of a frequency regulator.

The rolling device (calender) comprising three rollers (2a, 2b, 2c) provides the first cooling down of the sheet material (1) after it has left the extrusion device (6). As irregular cooling down of the sheet material will result in stresses in the material, it is very important that the sheet material (1) will also always remain in contact with the upper roller (2c), as the cooling process will otherwise not proceed correctly. Thus, the distance A must preferably be zero, so that the sheet material is in contact with the upper roller (2c). The sheet material (1) should remain in contact with the upper roller (2c) until it reaches the highest point on this upper roller (2c), after which the downward movement towards the sagging part starts.

Since this embodiment produces plates having a thickness between 2 mm and 10 mm, the distance between the sensor (7) and the lowest point of the sagging sheet material, distance B, depends on the thickness of the plate produced. Depending on the thickness of the plate, the distance B will change since the specific weight, the stiffness of the plate, and the associated amount of sagging sheet material has to ensure that the distance A always remains zero and that the sheet material (1) remains in contact with the upper roller (2c). The force of gravity to which the plate is subjected when leaving the upper roller (2c) consequently has to be sufficiently large to ensure the continuous contact and reduce the distance A to zero. This force of gravity may be influenced by increasing or decreasing the distance B.

After extensive research, the patent proprietor found that, with a predetermined production window of 2 mm to 10 mm plate thickness, the minimum distance C between the contact surface where the plate leaves the upper roller (2c) and the point of engagement of the plate with the first roller (9) of the roller track has to be 15 to 20 cm.

The invention claimed is:

1. Method for forming a sheet material (1), in which a polymer mass is melted under pressure, subsequently forced through an extruder head in the form of a plate-shaped plastic strand, which is then processed between two or more rollers of a rolling device (2) to form a plate of a certain thickness which is then removed by means of a removing device in the direction of a sawing device (3) in order to be shortened to the desired length, wherein the resulting plate (1) has a thickness of at least 2 mm when leaving the rolling device (2) and further comprising sagging the resulting plate (1) after leaving the rolling device (2) and prior to reaching the removing device in order to lower internal material stress of the plate (1), before being removed along a downward slope by means of the removing device.

2. Method according to claim 1, wherein the degree of sagging is controlled by a force (F) which is exerted on the sheet material (1) by a control device (4) while it is being removed in the direction of the sawing device.

3. Method according to claim 1, wherein the sheet material (1) has a modulus of elasticity (E) of at least 1 GPa.

4. Method according to claim 1, wherein the sheet material (1) is made from S-PVC.

5. Method according to claim 1, wherein the sheet material (1) has a K value of at least 50 and at most 78.

6. Method according to claim 1, wherein the sheet material (1) comprises at most 15% by weight of plasticizers.

7. Method according to claim 1, wherein the sheet material (1) comprises at most 10% by weight of plasticizers.

8. Device (5) for forming a sheet material (1) comprising an extrusion device (6) for forming a plate-shaped plastic strand, a rolling device (2) comprising one or more rollers (2a; 2b; 2c) configured to process the plate-shaped plastic strand to form a plate (1) having a minimum thickness of 2 mm, and a removing device for removing the plate in the direction of a sawing device (3), wherein the device (5) comprises detection means (7), and in that the device (5) is configured to control the speed of removal of the plate (1) in such a way that, based on the signals generated by the detection means (7), the plate (1) sags when leaving the rolling device and before reaching the removing device and wherein the plate is removed along a downward slope by the removing device.

9. Device (5) according to claim 8, wherein the removing device comprises a roller track (8) which is inclined towards the sawing device (3).

10. Device (5) according to claim 8, wherein the removing device furthermore comprises a control device (4) configured to exert a force (F) for controlling the speed of removal of the plate (1).

* * * * *